(12) United States Patent
Matsui

(10) Patent No.: US 6,252,882 B1
(45) Date of Patent: *Jun. 26, 2001

(54) CHIRP SPREAD SPECTRUM SIGNAL MULTIPLE ACCESS APPARATUS

(75) Inventor: Hitosi Matsui, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/918,377

(22) Filed: Aug. 26, 1997

(30) Foreign Application Priority Data

Aug. 26, 1996 (JP) .................................................. 8-223764

(51) Int. Cl.⁷ .................................................. H04L 27/30

(52) U.S. Cl. .................................................. 370/441; 375/139

(58) Field of Search .................................................. 370/320, 335, 370/342, 441; 375/200, 204, 139, 130, 263, 348

(56) References Cited

U.S. PATENT DOCUMENTS

| 4,748,639 | * | 5/1988 | Feggeler | 375/285 |
| 4,943,974 | * | 7/1990 | Motamedi | 375/200 |
| 5,090,024 | * | 2/1992 | Mey et al. | 375/204 |
| 5,113,278 | * | 5/1992 | Degura et al. | 359/154 |
| 5,295,151 | * | 3/1994 | Skudera, Jr. et al. | 375/204 |
| 5,424,631 | * | 6/1995 | Ward | 324/76.19 |
| 5,504,774 | * | 4/1996 | Takai et al. | 375/204 |
| 5,701,328 | * | 12/1997 | Schuchman et al. | 375/204 |
| 5,767,738 | * | 6/1998 | Brown et al. | 329/304 |
| 5,774,492 | * | 6/1998 | Orlowsik, Jr. et al. | 375/206 |
| 6,049,563 | * | 4/2000 | Matsui | 375/201 |

FOREIGN PATENT DOCUMENTS 7-50649   2/1995   (JP) .

OTHER PUBLICATIONS

Kim et al, Coded Multiple Chirp Spread Spectrum System and Overlay Service; IEEE 1988 pp. 561–565.*

Suhartanto et al. Dispersive Chirp Combining Spread–Spectrum System; IEEE 1992; pp. 291–294.*

* cited by examiner

Primary Examiner—Melvin Marcelo
Assistant Examiner—Jasper Kwoh
(74) Attorney, Agent, or Firm—Ostrolenk, Faber, Gerb & Soffen, LLP

(57) ABSTRACT

In the transmission device, a time-shared signal distributed and outputted from the separator 101 and a transmission delay signal while the time-shared signal being delayed by the delay circuit 102 are added and combined by the adder 103, outputted as the transmission adding signal, the transmission adding signal is convolved to the chirp signal by the chirp filter 104 to cause the outputted transmission convolved signal to be modulated by the modulator 105 and then the signal is outputted as the modulation signal. In the signal receiving device, each of the received convolved signal having the modulated signal convolved by the inverse chirp filter 110 with the signal having a characteristic opposite to that of the chirp signal and the received delay signal delayed by the delay circuit 111 is sampled with the samplers 112, 113 so as to output sample signals, these sample signals are added and combined by the adder 114 to output the received adding signal indicating the demodulated receiving signal.

5 Claims, 7 Drawing Sheets

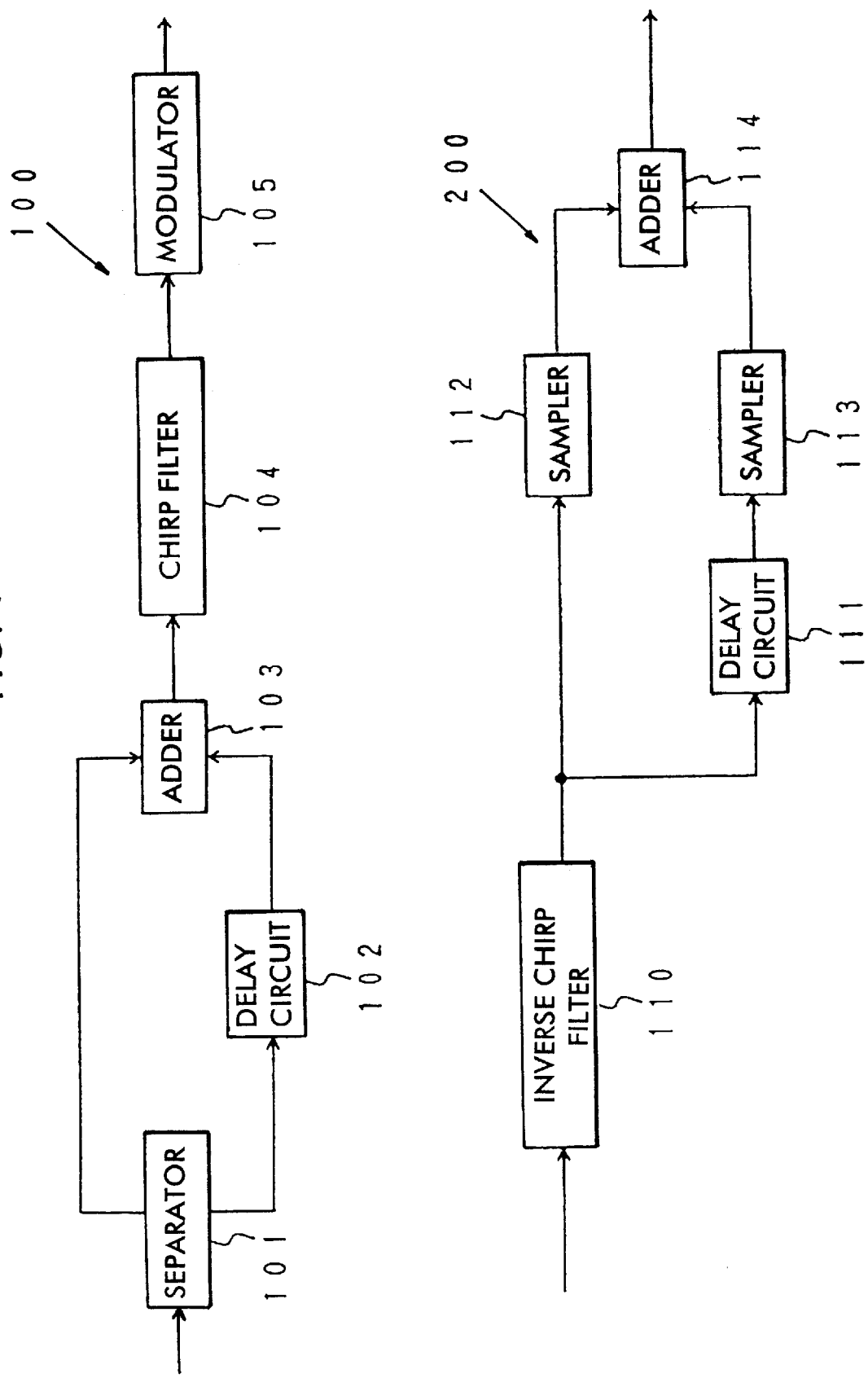

CHIRP SPREAD SPECTRUM SIGNAL MULTIPLE ACCESS APPARATUS

BACKGROUND OF THE INVENTION

1. Field of the Invention

This invention relates to a chirp spread spectrum signal multiple access apparatus in which a signal multiple access is carried out by offsetting a plurality of signals in view of time under application a chirp signal as a spread spectrum code.

2. Brief Description of the Related Art

As the prior art signal multiple access system using spread spectrum, it is possible to provide a code division multiple access communication apparatus disclosed in a gazette of Japanese Patent Laid-Open No. Hei 7-50649, for example. In this code division multiple access communication apparatus, an information code is processed in direct-spread with a spread code and its major constitution is as indicated in FIG. 8.

In the code division multiple access communication apparatus shown in FIG. 8, the multiple access number (n) is defined as 2 and a symbol interval of the information code is defined as Ts. A transmission side of the code division multiple access communication apparatus is comprised of information code generators 201, 202, spreading circuits 203, 204, spread code generator 205, delay circuit 206, adder 207 and modulator 208. At the receiving side, it is comprised of a de-spreading filter 210, delay circuit 211 and samplers 212, 213.

At the receiving side of the code division multiple access communication apparatus, transmission code generated at the information code generator 202 is convolved by the spreading circuit 204 with a spreading code outputted from the spread code generator 205 so as to spread it. In addition, at the transmission side of it, the transmission code generated from the information code generator 201 is also convolved with the spread code outputted from the spread code generator 205 so as to spread it.

If the outputs from the spreading circuits 203, 204 are added and made composite by the adder 207, an output from the spreading circuit 203 and an output from the spreading circuit 204 can not be discriminated at the receiving side and further an output from the information code generator 201 and an output from an information code generator can not be separated at the receiving side. In view of this fact, at the transmission side, a delay spreading code in which a spreading code outputted from the spreading code generator 205 is delayed only by Ts/2 with the delay circuit 206 is supplied to the spreading circuit 203.

Output signals from the spreading circuit 203 and the spreading circuit 204 are added by the adder 207 and outputted as one adding signal. At the modulator 208, modulation for converting a signal into a signal format which can easily be transmitted in respect to the adding signal is carried out and then a modulation signal is transmitted and outputted from the modulator 208.

In turn, at the receiving side, a correlative calculation is carried out with a demodulation signal and the same spreading code as the spreading code generated by the spreading code generator 205 by the inverse spreading filter 210 having a modulation signal received and inputted thereto. Filtering signals outputted from the inverse spreading filter 210 are displaced by Ts/2 and divided into two segments, respectively, one of the segments is extracted by a sampler 212 and the other segment is delayed by the delay circuit 211 only by Ts/2, thereafter it is extracted with the sampler 213 at the same timing as that for the sampler 212 so as to attain a sample signal supplied to the demodulation receiving processing.

In this way, if the timings for the spreading codes are displaced to perform a signal multiple access processing, it becomes possible to perform a faster signal transmission under the same frequency range width.

A case in which a signal multiple access processing with a direct spreading using the aforesaid spreading code will be studied in reference to a case in which it is applied to a portable terminal and the like, for example. In general, a chip rate of the spreading code in the direct spreading system is set to be more than ten times of a symbol rate (1/Ts) of the information code, although due to this fact, there may occur a problem that a calculation speed of the spreading circuit may become remarkably fast and a power consumption of element is increased. In particular, since the portable terminal uses battery cells as its power supply, it is difficult to employ a communication system showing a high power consumption.

SUMMARY OF THE INVENTION

The present invention has been completed in order to solve the aforesaid problems and it is an object of the present invention to provide a chirp spread spectrum code multiple access apparatus capable of realizing a more total superior signal transmission under such a circumstance as one in which a small-sized and light weight device or low power consumption is required even if a transmission characteristic is slightly deteriorated as found in the portable terminal.

According to one aspect of the invention, there is provided a spread spectrum signal multiple access apparatus comprised of a transmission device and a receiving device performing a signal multiple access processing under application of spread spectrum, wherein the transmission device includes:

a separator for dividing transmission data into n signals (n is integer more than 1), distributing and outputting it as the number n of divided signals;

delay means for applying a different delay time to each of the number n of divided signals and outputting them as the number of (n) of transmission delay signals;

adder for adding the number n of transmission delay signals and outputting the transmission added signals;

a chirp filter for convolving the transmission added signals to chirp signals and outputting them as transmission convolving signals; and a modulator for modulating the transmission convolving signals and outputting them as modulated signals, the receiving device includes:

an inverse chirp filter for receiving and inputting the modulation signal, convolving it with a signal having an inverse characteristic opposite to the chirp signal and outputting it as a received convolving signal;

the number of n-1 of delay circuits for delaying each of the receiving convolving signals and outputting them as receiving delay signals;

the number of n samplers for sampling the number n-1 of receiving delay signals and the receiving convolving signals and outputting sample signals; and an adder for adding and combining the number n of sample signals and outputting the receiving added signals as demodulation receiving signals.

According to another aspect of the invention, there is provided a spread spectrum signal multiple access apparatus comprised of a transmission device and a receiving device performing a signal multiple access processing under application of spread spectrum, wherein the transmission device includes:

a separator for time sharing the number n of transmission data signals (n is an integer more than 1), distributing and outputting them as time-shared signals;

the number n of chirp filters for generating and outputting transmission chirp filter signals in which only absolute delay times in respect to the chirp signals in an impulse response for the number of (n) of time-shared signals are different, respectively;

an adder for adding the number n of transmission chirp filter signals and outputting the transmission added signals; and a modulator for modulating the transmission added signals and outputting them as modulated signals; and the receiving device includes:

an inverse chirp filter for receiving and inputting the modulated signals, convolving them with a signal having a characteristic opposite to that of the chirp signal, and outputting them as received convolving signals;

the number n–1 of delay circuits for delaying each of the received convolving signals in different delay time, respectively, and outputting them as received delay signals;

the number n of samplers for sampling the number n–1 of received delay signals and the received convolved signals and outputting sample signals; and an adder for adding, completing number n of sample signals and outputting the received adding signals as the demodulated receiving signals.

BRIEF DESCRIPTION OF THE DRAWINGS

FIG. 1 is a block diagram for showing a chirp spread spectrum signal multiple access apparatus of one preferred embodiment of the present invention.

FIGS. 2A, 2B and 2C are time charts for illustrating an impulse response of a chirp signal in a chirp filter 104 in FIG. 1, wherein FIG. 2A shows an impulse input waveform, FIG. 2B shows an output waveform and FIG. 2C shows an output frequency of a chirp signal, respectively.

DETAILED DESCRIPTION OF THE PREFERRED EMBODIMENTS

Figure 2A:

Referring now to the drawings, some preferred embodiments of a chirp spread spectrum signal multiple access apparatus of the present invention will be described in detail. FIG. 1 is a block diagram for showing a constitution of a substantial part of the chirp spread spectrum signal multiple access apparatus of one preferred embodiment of the present invention, wherein the number of multiple access of signals n is defined as 2.

This chirp spread spectrum signal multiple access apparatus is comprised of a transmission device and a receiving device for performing a signal multiple access processing under application of the spread spectrum. A transmission device 100 is comprised of a separator 101 for separating the transmission data into the number of n signals (n is an integer more than 1), outputting the separated data in separate form as signals ranging from the first separated signal to the n-th separated signal; the number of (n–1) delay circuits 102 for delaying the separated signals ranging from the second to the n-th separated signals with a different delay time; an adder 103 for adding and completing the number n–1 of transmission delay signals and the first separated signal to output a transmission added signal; a chirp filter 104 for convolving the transmission added signal with the chirp signal and outputting it as a transmission convolved signal; and a modulator 105 for modulating the transmission convolved signal and outputting it as a modulation signal.

In addition, the receiving device 200 is comprised of an inverse chirp filter 110 for receiving and inputting a modulated signal, convolving it with a signal having an inverse characteristic to that of the chirp signal and outputting it as a received convolved signal; the number of (n–1) of the delay circuits 111 for delaying the received convolved signal with a different delay time incorrespondence with the delay times of the number of (n–1) of the delay circuits 102 in the transmission device so as to output them as the number n—1 of the received delay signals; the number n of the samplers 112, 113 for sampling the number n–1 of the received delay signals and the received convolved signals and outputting the sample signals; and an adder 114 for adding and completing the number n of sample signals and outputting the received added signals as modulated received signals.

In these circuits, the chirp filter 104 is composed of a filter such as a Surface Acoustic Wave (SAW) in which an impulse response becomes a chirp signal. Similarly, the inverse chirp filter 110 is also composed of a SAW filter. Each of the separator 101, delay circuit 102, adder 103, delay circuit 111, sampler 112, sampler 113 and adder 114 is constituted by a digital logic circuit in which a calculation speed is operated at about a symbol rate of transmission data. In this configuration, it is not necessary to perform a logical calculation at a speed more than ten times of the symbol rate as found in the direct spread system using the spread signal. Accordingly, the present preferred embodiment can be constituted only with circuits of low speed and low consumption power.

In the transmission device of this chirp spread spectrum signal multiple access apparatus, transmission data with a symbol interval of Ts/2 is supplied to the separator 101. The separator 101 separates this transmission data into a separated signal and a second separated signal. A symbol interval of each of the separated signals becomes Ts, respectively. The first separated signal outputted from the separator 101 is directly inputted to the adder 103. The second separated signal is supplied to the delay circuit 102, delayed only by Ts/2 and then inputted to the adder 103 as the transmission delay signal. At the adder 103, the transmission delay signal and the first separated signal are added and complexed to each other, and supplied to the chirp filter 104 as the transmission added signal. At the chirp filter 104, the transmission added signal is processed with a convolving processing with the chirp signal, namely, a spread spectrum processing based on the chirp signal is applied to it and then this is outputted to the modulator 105 as the transmission convolving signal. The modulator 105 applies a modulation to the transmission convolving signal for converting it into such a signal format as one which may easily be transmitted at a wireless transmission path and then a modulated signal is outputted.

In turn, the receiving device 200 receives and inputs the modulated signal through the inverse chirp filter 110. The inverse chirp filter 110 performs a filter processing having an inverse characteristic to that of the chirp filter 104, namely performs an inverse spread of spectrum so as to output the received convolving signal. Since the received convolving signal outputted from the inverse chirp filter 110 is multiplexed with two signals with a displacement of only Ts/2, one of them is extracted by the sampler 112 and the other is delayed by the delay circuit 111 only with Ts/2 so as to attain the receiving delay signal, thereafter the signal is extracted by the sampler 113. Each of the samplers 112, 113 performs a sampling of each of the received convolving signal and the received delay signal so as to output a sample signal. These sample signals are added and complexed by the adder 114 and outputted as the received adding signal indicating a demodulated received signal. Namely, at the adder 114, a signal combining processing opposite to the signal distributing processing carried out at the separator 101 is performed.

Figure 2B:
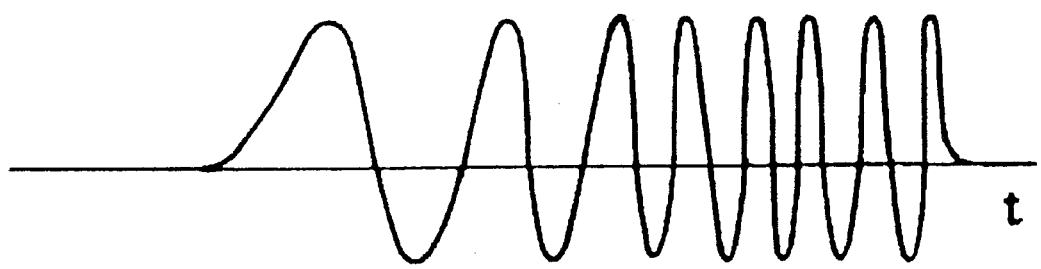
Figure 2C:
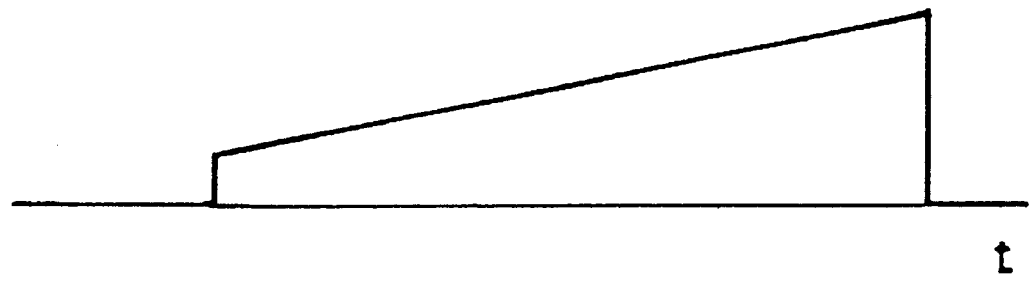

In this case, the chirp signal used in the chirp filter 104 of the transmission device is a signal in which a frequency of sinusoidal wave is increased as a time t elapses as shown in FIG. 2B, and a frequency of such a chirp signal as above is increased as a time t elapses as shown in FIG. 2C. Namely, the chirp filter 104 has a characteristic in which as the impulse shown in FIG. 2A is inputted, a waveform shown in FIG. 2B is outputted.

Figure 3A:
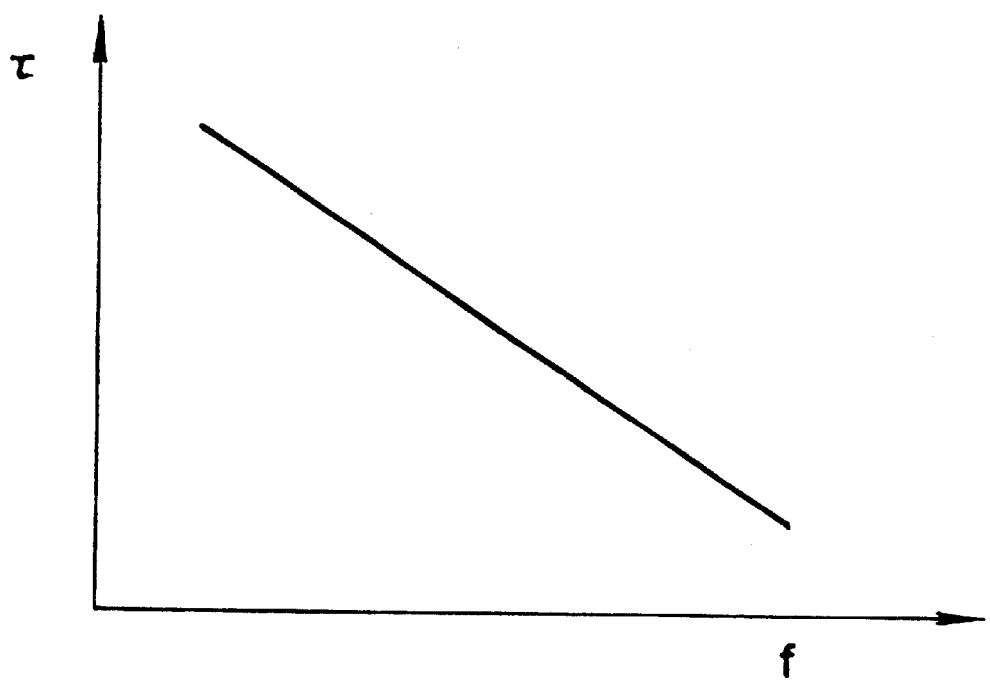
FIGS. 3A and 3B are time charts for illustrating a chirp signal in an inverse chirp filter 110 in FIG. 1, wherein FIG. 3A indicates a delay characteristic for a frequency and FIG. 3B indicates an output waveform.
Figure 3B:
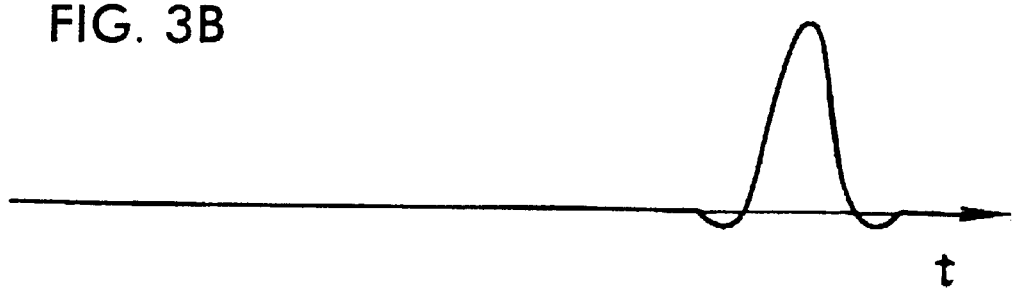

In turn, as shown in FIG. 3A, the chirp signal used in the inverse chirp filter 110 at the receiving device has a characteristic in which as a frequency f is increased, its amplitude characteristic is kept constant, a low frequency component f at the extremity end of the signal is outputted in a certain delay while being passed through the filter where a delay amount τ is decreased and a frequency component f having a high extremity end is outputted while not being so delayed as much. Due to this fact, as shown in FIG. 3B, the output from the inverse chirp filter 110 becomes an impulse form in which a chirp signal expanded in view of time at the transmission side is compressed.

Figure 4:
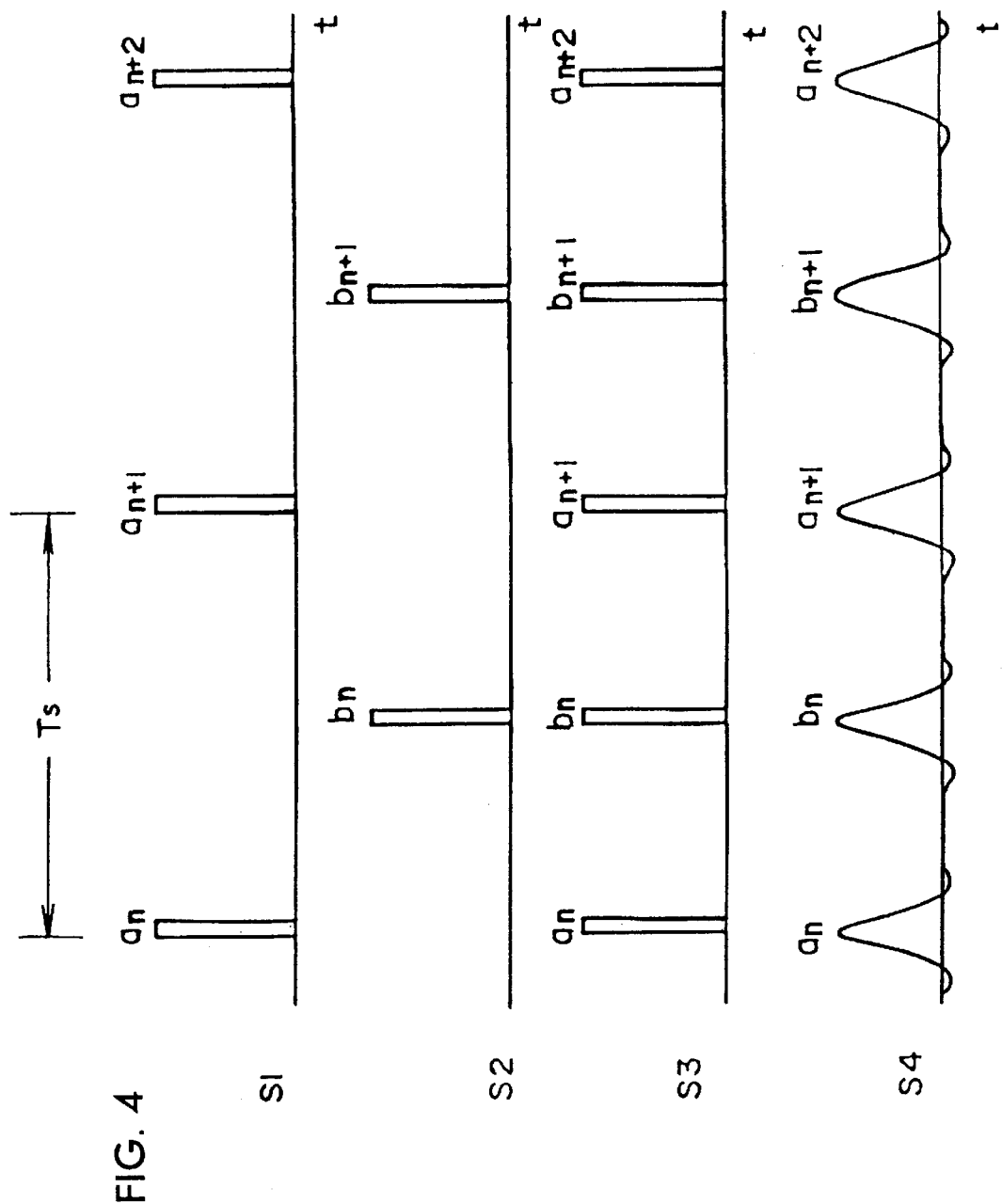
FIG. 4 is a timing chart for showing operations of the transmission device and the receiving device in the chirp spread spectrum signal multiple access apparatus in FIG. 1.

In FIG. 4 is shown a waveform at each of the segments where the multiple access is carried out with the multiple access number=2 under application of this chirp signal. At the transmission device, an input signal S1 having a symbol interval Ts and an input signal S2 separate from the former input signal are added to each other with a Ts/2 being displaced and then a spread spectrum is carried out with the chirp signal. In this case, although the chirp signal of the input signal S1 and the chirp signal of the input signal S2 are overlapped to each other in view of their time to cause an inter-symbol interference to be generated, at the receiving device, an inverse spread spectrum of the inverse chirp filter 110 is carried out to enable the signal to be separated as two signals S3 and S4.

Figure 5:
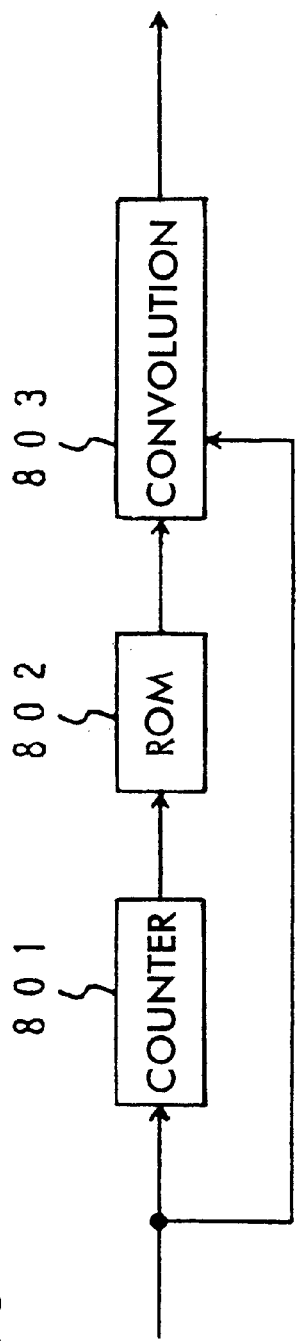
FIG. 5 is a circuit block diagram for illustrating a case in which a chirp filter in FIG. 1 is constituted by a digital circuit.

The chirp filter 104 can be constituted by a digital circuit. As shown in FIG. 5, the chirp filter having digital circuit configuration is comprised of a counter 801 for counting clock signals from a stored clock source with an adding signal from the adder 103 shown in FIG. 1 being applied as a trigger and for generating an address signal; a read-only-memory 802 for outputting the stored chirp signals therein in response to the address signal; and a convolving calculator for performing a convolving calculation of the added signal and the chirp signal and outputting a transmission convolving signal. Namely, an address of ROM 802 is determined by a counter 801 with an adding signal being applied as a trigger, and a chirp signal from ROM 802 and the adding signal are calculated in convolving at the convolving calculator 803, thereby the chirp filter can be constituted by the digital circuits.

The chirp filter shown in FIG. 5 has a more superior temperature and aging characteristic as compared with the chirp filter using the SAW filter. Although the chirp filter shown in FIG. 5 requires a faster calculation speed than the symbol rate 1/Ts, the device requiring this fast calculation speed is only the transmission device and the receiving device can perform a requisite processing at a calculation speed of about symbol rate or the like, so that a power consumption in an entire transmission or receiving device is lower than that of the prior art described in the gazette of Japanese Patent Laid-Open No.Hei 7-50649.

Figure 6:
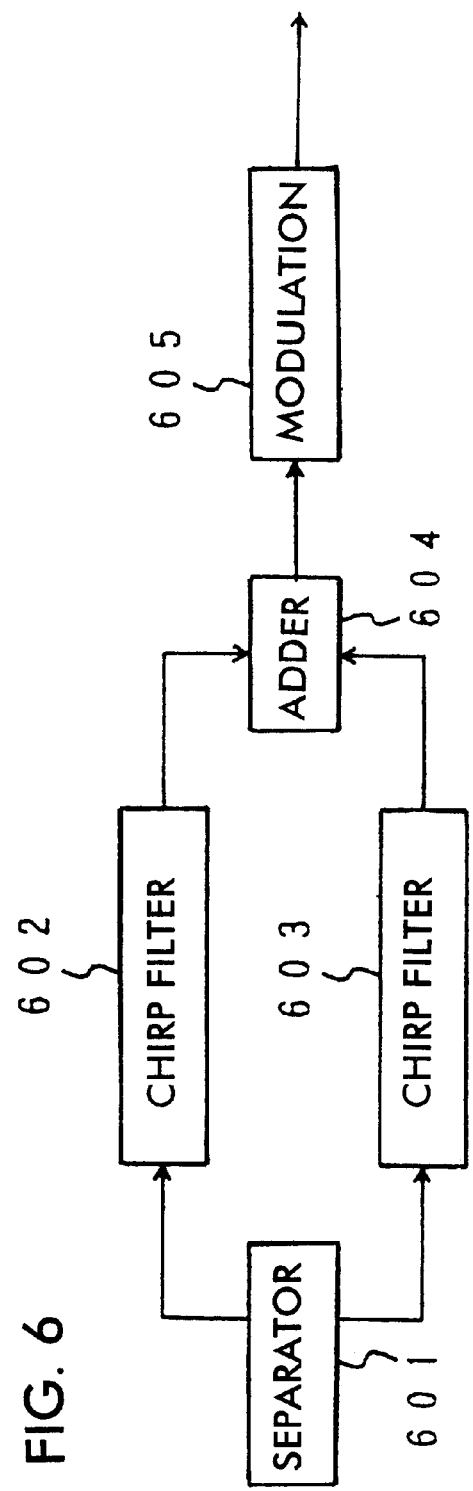
FIG. 6 is a block diagram for showing a configuration of the transmission device in the chirp spread spectrum signal multiple access apparatus of another preferred embodiment of the present invention.

FIG. 6 is a block diagram for showing a constitution of the substantial parts in the transmission or receiving device in the chirp spread spectrum multiple access apparatus of another preferred embodiment of the present invention.

This chirp spread spectrum multiple access apparatus of another preferred embodiment of the present invention is constructed by modifying the transmission device in the preferred embodiment shown in FIG. 1 as shown in FIG. 6. Namely, this transmission device is comprised of a separator 601 for separating transmission data into the number of (n) (n is an integer more than 1) of separated signals and distributing or outputting them as the time-shared signals for the first separated signal and the second separated signal; the number n of chirp filters 602, 603 to each of which the first and the second separated signals are inputted and for generating or outputting the chirp filtering signals having only different absolute delay time about the chirp signal in these impulse responses; an adder 604 for adding and combining the number of (n) of the chirp filtering signals and outputting the transmission adding signal; and a modulator 605 for modulating the transmission adding signal and outputting it as a modulation signal.

Figure 7:
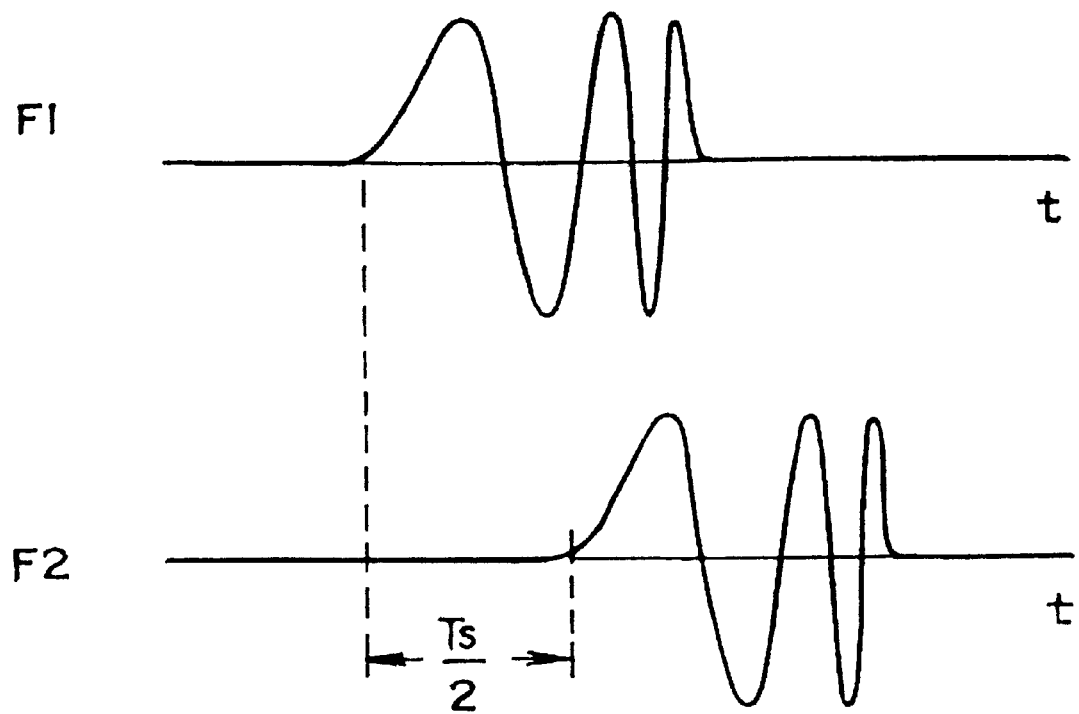
FIG. 7 is a view for illustrating an impulse response of each of chirp filters 602, 603 installed in the transmission device shown in FIG. 6.
Figure 8:
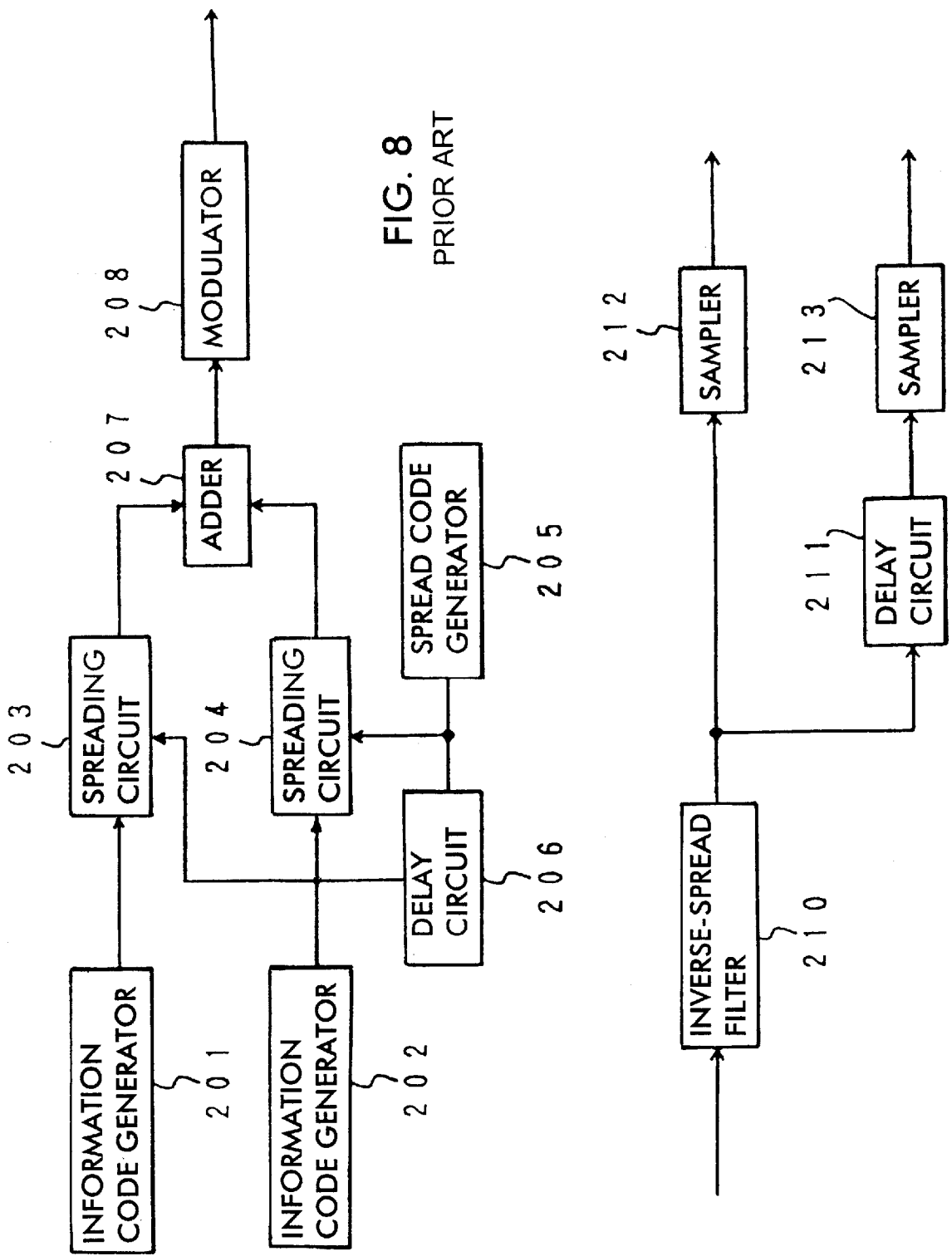
FIG. 8 is a block diagram for showing a configuration of a substantial part of the code dividing multiple access communication apparatus of the signal multiple access system using the prior art spread spectrum.

In this preferred embodiment, as shown at F1 and F2 in FIG. 7, each of the impulse responses in the chirp filters 602, 603 can have the same characteristic even if the delay circuit 102 in the transmission device in the preferred embodiment of the present invention shown in FIG. 1 is eliminated due to the fact that the delay time in each of the filters is displaced only by Ts/2 from each other. In this case, the chirp filters 602, 603 can also be constituted by the digital circuits shown in FIG. 5.

As described above, the chirp spread spectrum signal multiple access apparatus of the present invention has no configuration in which a signal processing is carried out at a chip rate having a speed more than ten times of a data symbol rate as found in the direct spread spectrum apparatus using the spread code. Due to this fact. it is not necessary for the present invention to arrange the expensive and high-speed elements, a low speed operation becomes possible in a relative simple configuration to restrict a power consumption low and then a more high speed signal transmission can be attained in a limited frequency range. Accordingly, an application of this chirp spread spectrum signal multiple access apparatus becomes quite effective in such a field as one in which a small-sized light weight application or low power consumption device is most importantly taken as found in a portable terminal or the like.

Modification of the invention herein disclosed will occur to a person skilled in the art and all such modifications are deemed to be within the scope of the invention as defined by the appended claims.

What is claimed is:

1. A chirp spread spectrum signal multiple access apparatus comprised of a transmission device and a receiving device performing a signal multiple access processing under application of spread spectrum, said transmission device including:

a separator for dividing transmission data into n signals (n is an integer more than 1), distributing and outputting them as the number n of divided signals;

delay means for applying a different delay time to each of said number n of divided signals and outputting them as the number n of transmission delay signals;

adder for adding said number n of transmission delay signals and outputting the transmission added signals;

a chirp filter for convolving said transmission added signals to chirp signals and outputting them as transmission convolving signals; and a modulator for modulating said transmission convolving signals and outputting them as modulated signals.

2. A chirp spread spectrum signal multiple access apparatus according to claim 1, wherein said receiving device includes:

an inverse chirp filter for receiving and inputting one of said modulated signals, convolving them with a signal having an inverse characteristic opposite to that of one of said chirp signals and outputting received convolving signals;

the number of (n−1) of delay circuits for delaying each of said received convolving signals and outputting them as receiving delay signals;

the number of (n) of samplers for sampling said number of (n−1) of receiving delay signals and said receiving convolving signals and outputting sample signals; and an adder for adding and combining said number of (n) of sample signals and outputting the receiving added signals as demodulation receiving signals.

3. A chirp spread spectrum signal multiple access apparatus according to claim 1, wherein said chirp filter is comprised of:

a counter for counting clock signals from a clock source stored therein with said transmission added signals being applied as a trigger and for generating an address signal;

a read-only-memory having chirp signals stored therein and outputting a chirp signal stored therein in response to its address signal; and a convolving calculator for performing a convolving calculation of said transmission added signals and the chirp signal read out of said read-only-memory and outputting said transmission convolving signals.

4. A chirp spread spectrum signal multiple access apparatus comprised of a transmission device and a receiving device performing a signal multiple access processing under application of spread spectrum, wherein said transmission device includes:

a separator for time sharing the number n of transmission data signals (n is an integer more than 1), distributing and outputting them as time-shared signals;

the number n of chirp filters for generating and outputting transmission chirp filter signals in which only absolute delay times in respect to the chirp signals in an impulse response for said number n of time-shared signals are different, respectively;

an adder for adding said number n of transmission chirp filter signals and outputting the transmission added signals; and a modulator for modulating said transmission added signals and outputting them as modulated signals.

5. A chirp spread spectrum signal multiple access apparatus according to claim 4, wherein said receiving device includes:

an inverse chirp filter for receiving and inputting said modulated signals, convolving them with a signal having a characteristic opposite to that of said chirp signal, and outputting them as received convolving signals;

the number n−1 of delay circuits for delaying each of said received convolving signals in different delay time, respectively, and outputting them as received delay signals;

the number n of samplers for sampling said number n−1 of received delay signals and said received convolved signals and outputting sample signals; and an adder for adding, complexing said number n of sample signals and outputting the received adding signals as the demodulated receiving signals.

* * * * *